United States Patent
Gliner

(10) Patent No.: US 12,484,959 B2
(45) Date of Patent: Dec. 2, 2025

(54) ACCURATE TISSUE PROXIMITY

(71) Applicant: BIOSENSE WEBSTER (ISRAEL) LTD., Yokneam (IL)

(72) Inventor: Vadim Gliner, Haifa (IL)

(73) Assignee: BIOSENSE WEBSTER (ISRAEL) LTD., Yokneam (IL)

( * ) Notice: Subject to any disclaimer, the term of this patent is extended or adjusted under 35 U.S.C. 154(b) by 404 days.

(21) Appl. No.: 17/403,047

(22) Filed: Aug. 16, 2021

(65) Prior Publication Data

US 2022/0183748 A1    Jun. 16, 2022

Related U.S. Application Data

(60) Provisional application No. 63/126,152, filed on Dec. 16, 2020.

(51) Int. Cl.
| | |
|---|---|
| *A61B 18/14* | (2006.01) |
| *G16H 50/20* | (2018.01) |
| *A61B 18/00* | (2006.01) |

(52) U.S. Cl.
CPC ......... *A61B 18/1492* (2013.01); *G16H 50/20* (2018.01); *A61B 2018/00577* (2013.01);
(Continued)

(58) Field of Classification Search
CPC ...... A61B 18/1492; A61B 2018/00577; A61B 2018/00827; A61B 2018/00875;
(Continued)

(56) References Cited

U.S. PATENT DOCUMENTS

| | | |
|---|---|---|
| 5,078,714 A | 1/1992 | Katims |
| 5,341,807 A | 8/1994 | Nardella |
| | (Continued) | |

FOREIGN PATENT DOCUMENTS

| | | | |
|---|---|---|---|
| CA | 2285342 | A1 | 10/1998 |
| EP | 2700373 | A1 | 2/2014 |
| WO | WO1996005768 | A1 | 2/1996 |

OTHER PUBLICATIONS

European Search Report for corresponding EPA No. 21214612.0 dated May 25, 2022.
(Continued)

*Primary Examiner* — Linda C Dvorak
*Assistant Examiner* — Lindsay Regan Lancaster
(74) *Attorney, Agent, or Firm* — Scully, Scott, Murphy & Presser, P.C.

(57) ABSTRACT

In one embodiment, a method to find tissue proximity indications includes inserting a catheter into a body part of a living subject such that electrodes of the catheter contact tissue at respective locations within the body part, receiving signals provided by the electrodes, selectively rewarding and penalizing a reinforcement learning agent over reinforcement learning exploration phases to learn at least one tissue proximity policy responsively to at least one of the received signals, applying the reinforcement learning agent in reinforcement learning exploitation phases to find respective tissue-proximity actions to be taken that maximize respective expected rewards responsively to the at least one tissue proximity policy, and providing respective derived tissue-proximity indications of proximity of a given one of the electrodes with the tissue responsively to the found respective tissue-proximity actions.

20 Claims, 8 Drawing Sheets

(52) U.S. Cl.
CPC ............... *A61B 2018/00827* (2013.01); *A61B 2018/00875* (2013.01); *A61B 2018/1467* (2013.01)

(58) Field of Classification Search
CPC ............ A61B 2018/1467; A61B 5/068; A61B 2017/00026; A61B 2018/0016; A61B 2018/00214; A61B 2018/00351; A61B 2018/00666; A61B 2018/00791; A61B 2018/00839; A61B 2018/124; A61B 2090/061; A61B 2218/002; A61B 5/063; A61B 5/6852; A61B 5/6886; A61B 5/7267; A61B 5/062; A61B 5/283; A61B 18/12; A61B 18/245; G16H 50/20; G16H 40/63; G16H 50/70; G06N 3/088; G06N 5/01; A61M 25/0127

See application file for complete search history.

(56) References Cited

U.S. PATENT DOCUMENTS

| | | | |
|---|---|---|---|
| 5,391,199 A | 2/1995 | Ben Haim | |
| 5,447,529 A | 9/1995 | Marchlinski | |
| 5,469,857 A | 11/1995 | Laurent | |
| 5,662,108 A | 9/1997 | Budd | |
| 5,673,704 A | 10/1997 | Marchlinski | |
| 5,836,874 A | 11/1998 | Swanson | |
| 5,836,990 A | 11/1998 | Li | |
| 5,891,095 A | 4/1999 | Eggers | |
| 5,935,079 A | 8/1999 | Swanson | |
| 6,050,267 A * | 4/2000 | Nardella | A61B 5/063 |
| | | | 128/899 |
| 6,239,724 B1 | 5/2001 | Doron | |
| 6,332,089 B1 | 12/2001 | Acker | |
| 6,484,118 B1 | 11/2002 | Govari | |
| 6,618,612 B1 | 9/2003 | Acker | |
| 6,690,963 B2 | 2/2004 | Ben Haim | |
| 7,756,576 B2 | 7/2010 | Levin | |
| 7,848,787 B2 | 12/2010 | Osadchy | |
| 7,869,865 B2 | 1/2011 | Govari | |
| 9,168,004 B2 | 10/2015 | Gliner | |
| 10,278,616 B2 | 5/2019 | Schwartz | |
| 2002/0065455 A1 | 5/2002 | Ben Haim | |
| 2003/0120150 A1 | 6/2003 | Govari | |
| 2004/0068178 A1 | 4/2004 | Govari | |
| 2007/0100332 A1 | 5/2007 | Paul | |
| 2009/0093806 A1 | 4/2009 | Govari | |
| 2009/0138007 A1 | 5/2009 | Govari | |
| 2013/0085416 A1 | 4/2013 | Mest | |
| 2014/0051959 A1* | 2/2014 | Gliner | A61B 5/7267 |
| | | | 606/41 |
| 2016/0143686 A1 | 5/2016 | Tunay | |
| 2017/0032245 A1* | 2/2017 | Osband | G06N 3/045 |
| 2017/0140270 A1* | 5/2017 | Mnih | G06N 3/04 |
| 2019/0117090 A1 | 4/2019 | Ishii | |
| 2020/0337648 A1* | 10/2020 | Saripalli | G16H 15/00 |
| 2021/0089869 A1* | 3/2021 | Baughman | G10L 15/16 |

OTHER PUBLICATIONS

You Hyeonseok et al: "Automatic control of cardiac ablation catheter with deep reinforcement learning method", Journal of Mechanical Science and Technology, vol. 33, No. 11, Nov. 1, 2019.

Sutton Richard S et al: "Reinforcement Learning: An Introduction Second edition, in progress", Jan. 1, 2015.

Baek Donghoon et al: "Path Planning for Automation of Surgery Robot based on Probabilistic Roadmap and Reinforcement Learning", 2018 15th International Conference on Ubiquitous Robots, IEEE, Jun. 26, 2018, pp. 342-347.

Danny Smyl and Dong Liuy, *Optimizing Electrode Positions for 2D Electrical Impedance Tomography Sensors Using Deep Learning*, Department of Civil and Structural Engineering, University of Sheffield, Sheffield, UK, Abstract.

* cited by examiner

ACCURATE TISSUE PROXIMITY

RELATED APPLICATION INFORMATION

The present application claims benefit of U.S. Provisional Patent Application Ser. No. 63/126,152, filed 16 Dec. 2020, the disclosure of which is hereby incorporated herein by reference.

FIELD OF THE INVENTION

The present invention relates to medical systems, and in particular, but not exclusively to, catheter devices.

BACKGROUND

A wide range of medical procedures involve placing probes, such as catheters, within a patient's body. Location sensing systems have been developed for tracking such probes. Magnetic location sensing is one of the methods known in the art. In magnetic location sensing, magnetic field generators are typically placed at known locations external to the patient. A magnetic field sensor within the distal end of the probe generates electrical signals in response to these magnetic fields, which are processed to determine the coordinate locations of the distal end of the probe. These methods and systems are described in U.S. Pat. Nos. 5,391,199, 6,690,963, 6,484,118, 6,239,724, 6,618,612 and 6,332,089, in PCT International Publication No. WO 1996/005768, and in U.S. Patent Application Publications Nos. 2002/0065455 and 2003/0120150 and 2004/0068178, whose disclosures are all incorporated herein by reference. Locations may also be tracked using impedance or current based systems.

One medical procedure in which these types of probes or catheters have proved extremely useful is in the treatment of cardiac arrhythmias. Cardiac arrhythmias and atrial fibrillation in particular, persist as common and dangerous medical ailments, especially in the aging population.

Diagnosis and treatment of cardiac arrhythmias include mapping the electrical properties of heart tissue, especially the endocardium and the heart volume, and selectively ablating cardiac tissue by application of energy. Such ablation can cease or modify the propagation of unwanted electrical signals from one portion of the heart to another. The ablation process destroys the unwanted electrical pathways by formation of non-conducting lesions. Various energy delivery modalities have been disclosed for forming lesions, and include use of microwave, laser and more commonly, radiofrequency energies to create conduction blocks along the cardiac tissue wall. In a two-step procedure, mapping followed by ablation, electrical activity at points within the heart is typically sensed and measured by advancing a catheter containing one or more electrical sensors into the heart, and acquiring data at a multiplicity of points. These data are then utilized to select the endocardial target areas at which the ablation is to be performed.

Electrode catheters have been in common use in medical practice for many years. They are used to stimulate and map electrical activity in the heart and to ablate sites of aberrant electrical activity. In use, the electrode catheter is inserted into a major vein or artery, e.g., femoral artery, and then guided into the chamber of the heart of concern. A typical ablation procedure involves the insertion of a catheter having a one or more electrodes at its distal end into a heart chamber. A reference electrode may be provided, generally taped to the skin of the patient or by means of a second catheter that is positioned in or near the heart. RF (radio frequency) current is applied to the tip electrode(s) of the ablating catheter, and current flows through the media that surrounds it, i.e., blood and tissue, toward the reference electrode. The distribution of current depends on the amount of electrode surface in contact with the tissue as compared to blood, which has a higher conductivity than the tissue. Heating of the tissue occurs due to its electrical resistance. The tissue is heated sufficiently to cause cellular destruction in the cardiac tissue resulting in formation of a lesion within the cardiac tissue which is electrically non-conductive.

Therefore, when placing an ablation or other catheter within the body, particularly near the endocardial tissue, it is desirable to have the distal tip of the catheter in direct contact with the tissue. The contact can be verified, for example, by measuring the contact between the distal tip and the body tissue. U.S. Patent Application Publication Nos. 2007/0100332, 2009/0093806 and 2009/0138007, whose disclosures are incorporated herein by reference describe methods of sensing contact pressure between the distal tip of a catheter and tissue in a body cavity using a force sensor embedded in the catheter.

A number of references have reported methods to determine electrode-tissue contact, including U.S. Pat. Nos. 5,935,079; 5,891,095; 5,836,990; 5,836,874; 5,673,704; 5,662,108; 5,469,857; 5,447,529; 5,341,807; 5,078,714; and Canadian Patent Application 2,285,342. A number of these references, e.g., U.S. Pat. Nos. 5,935,079, 5,836,990, and 5,447,529 determine electrode-tissue contact by measuring the impedance between the tip electrode and a return electrode. As disclosed in the '529 patent, it is generally known than impedance through blood is generally lower that impedance through tissue. Accordingly, tissue contact has been detected by comparing the impedance values across a set of electrodes to premeasured impedance values when an electrode is known to be in contact with tissue and when it is known to be in contact only with blood.

U.S. Pat. No. 9,168,004 to Gliner, at al., which is herein incorporated by reference, describes using machine learning to determine catheter electrode contact. The '004 Patent describes cardiac catheterization being carried out by memorizing a designation of a contact state between an electrode of the probe and the heart wall as an in-contact state or an out-of-contact state, and making a series of determinations of an impedance phase angle of an electrical current passing through the electrode and another electrode, identifying maximum and minimum phase angles in the series, and defining a binary classifier adaptively as midway between the extremes. A test value is compared to the classifier as adjusted by a hysteresis factor, and a change in the contact state is reported when the test value exceeds or falls below the adjusted classifier.

US Patent Publication 2013/0085416 of Mest, which is herein incorporated by reference, describes a method for the in vivo re-calibration of a force sensing probe such as an electrophysiology catheter which provides for the generation of an auto zero zone. The distal tip of the catheter or other probe is placed in a body cavity within the patient. Verification that there is no tissue contact is made using electrocardiogram (ECG) or impedance data, fluoroscopy, or other real-time imaging data and/or an electro-anatomical mapping system. Once verification that there is no tissue contact made, the system recalibrates the signal emanating from the force sensor setting it to correspond to a force reading of zero grams and this recalibrated baseline reading is used to generate and display force readings based on force sensor data.

SUMMARY

There is provided in accordance with an embodiment of the present disclosure, a method to find tissue proximity indications, including inserting a catheter into a body part of a living subject such that electrodes of the catheter contact tissue at respective locations within the body part, receiving signals provided by the electrodes, selectively rewarding and penalizing a reinforcement learning agent over reinforcement learning exploration phases to learn at least one tissue proximity policy responsively to at least one of the received signals, applying the reinforcement learning agent in reinforcement learning exploitation phases to find respective tissue-proximity actions to be taken that maximize respective expected rewards responsively to the at least one tissue proximity policy, and providing respective derived tissue-proximity indications of proximity of a given one of the electrodes with the tissue responsively to the found respective tissue-proximity actions.

Further in accordance with an embodiment of the present disclosure the applying includes applying the reinforcement learning agent in respective ones of the reinforcement learning exploitation phases to find respective ones of the tissue-proximity actions to be taken that maximize respective expected rewards responsively to respective states of the reinforcement learning agent and respective sets of available tissue-proximity actions to be taken, and the selectively rewarding and penalizing includes selectively rewarding and penalizing the reinforcement learning agent over the reinforcement learning exploration phases responsively to data of respective last ones of the reinforcement learning exploitation phases, the data including respective ones of the states, respective found ones of the tissue-proximity actions to be taken, and respective actual rewards.

Still further in accordance with an embodiment of the present disclosure each of the sets of available tissue-proximity actions to be taken includes changing a respective one of the derived tissue-proximity indications provided in a respective last one of the reinforcement learning exploitation phases, and not changing the respective one of the derived tissue-proximity indications provided in the respective last one of the reinforcement learning exploitation phases.

Additionally in accordance with an embodiment of the present disclosure each one of the respective states includes the respective one of the derived tissue-proximity indications provided in the respective last one of the reinforcement learning exploitation phases, and a respective impedance value of the given electrode computed for a current respective one of the reinforcement learning exploitation phases.

Moreover, in accordance with an embodiment of the present disclosure, the method includes computing the respective actual rewards responsively to the respective found ones of the tissue-proximity actions to be taken and respective reference tissue-proximity indications computed independently of applying the reinforcement learning agent.

Further in accordance with an embodiment of the present disclosure, the method includes computing the respective impedance value of the given electrode for each one of the respective states responsively to at least one of the received signals, and computing the respective reference tissue-proximity indications independently of applying the reinforcement learning agent responsively to at least one of the received signals.

Still further in accordance with an embodiment of the present disclosure the computing the respective reference tissue-proximity indications includes computing the respective reference tissue-proximity indications responsively to respective impedance values of the given electrode.

Additionally in accordance with an embodiment of the present disclosure computing the respective actual rewards includes computing a sum of future discounted rewards.

Moreover, in accordance with an embodiment of the present disclosure the reinforcement learning agent is a deep-reinforcement learning agent.

Further in accordance with an embodiment of the present disclosure the reinforcement learning agent is a Q-learning model-free reinforcement learning agent.

Still further in accordance with an embodiment of the present disclosure, the method includes electrically coupling a first set of the electrodes of the catheter and the given electrode to a first signal processing unit, wherein the computing the respective reference tissue-proximity indications is performed by the first signal processing unit responsively to receiving at least one signal provided by the given electrode, and electrically coupling a second set of the electrodes of the catheter and the given electrode to a second signal processing unit, the second set of the electrodes being different from the first set of the electrodes, wherein the computing the respective impedance value of the given electrode for each one of the respective states is performed in the second signal processing unit responsively to receiving the at least one signal provided by the given electrode.

Additionally in accordance with an embodiment of the present disclosure, the method includes computing respective impedance values of respective ones of the second set of electrodes by the second signal processing unit, applying the reinforcement learning agent to find respective tissue-proximity actions to be taken that maximize respective expected rewards for the respective ones of the second set of electrodes responsively to the computed respective impedance values of the respective ones of the second set of electrodes, and providing respective derived tissue-proximity indications of proximity of the respective ones of the second set of electrodes with the tissue responsively to the found respective tissue-proximity actions to be taken for the respective ones of the second set of electrodes.

Moreover in accordance with an embodiment of the present disclosure, the method includes applying body surface electrodes to a skin surface of the living subject, electrically coupling the body surface electrodes to the first signal processing unit, and computing respective impedance values between the given electrode and the body surface electrodes, wherein the computing the respective reference tissue-proximity indications is performed by the first signal processing unit responsively to the computed respective impedance values.

There is also provided in accordance with another embodiment of the present disclosure, a system to find tissue proximity indications, including a catheter configured to be inserted into a body part of a living subject, and including electrodes configured to contact tissue at respective locations within the body part, and processing circuitry configured to receive signals provided by the electrodes, selectively reward and penalize a reinforcement learning agent over reinforcement learning exploration phases to learn at least one tissue proximity policy responsively to at least one of the received signals, apply the reinforcement learning agent in reinforcement learning exploitation phases to find respective tissue-proximity actions to be taken that maximize respective expected rewards responsively to the at least one tissue proximity policy, and provide respective derived tissue-proximity indications of proximity of a given one of the electrodes with the tissue responsively to the found respective tissue-proximity actions.

Further in accordance with an embodiment of the present disclosure the processing circuitry is configured to apply the reinforcement learning agent in respective ones of the reinforcement learning exploitation phases to find respective ones of the tissue-proximity actions to be taken that maximize respective expected rewards responsively to respective states of the reinforcement learning agent and respective sets of available tissue-proximity actions to be taken, and selectively reward and penalize the reinforcement learning agent over the reinforcement learning exploration phases responsively to data of respective last ones of the reinforcement learning exploitation phases, the data including respective ones of the states, respective found ones of the tissue-proximity actions to be taken, and respective actual rewards.

Still further in accordance with an embodiment of the present disclosure each of the sets of available tissue-proximity actions to be taken includes changing a respective one of the derived tissue-proximity indications provided in a respective last one of the reinforcement learning exploitation phases, and not changing the respective one of the derived tissue-proximity indications provided in the respective last one of the reinforcement learning exploitation phases.

Additionally in accordance with an embodiment of the present disclosure each one of the respective states includes the respective one of the derived tissue-proximity indications provided in the respective last one of the reinforcement learning exploitation phases, and a respective impedance value of the given electrode computed for a current respective one of the reinforcement learning exploitation phases.

Moreover, in accordance with an embodiment of the present disclosure the processing circuitry is configured to compute the respective actual rewards responsively to the respective found ones of the tissue-proximity actions to be taken and respective reference tissue-proximity indications computed independently of applying the reinforcement learning agent.

Further in accordance with an embodiment of the present disclosure the processing circuitry is configured to compute the respective impedance value of the given electrode for each one of the respective states responsively to at least one of the received signals, and compute the respective reference tissue-proximity indications independently of applying the reinforcement learning agent responsively to at least one of the received signals.

Still further in accordance with an embodiment of the present disclosure the processing circuitry is configured to compute the respective reference tissue-proximity indications responsively to respective impedance values of the given electrode.

Additionally in accordance with an embodiment of the present disclosure the processing circuitry is configured to compute a sum of future discounted rewards, and compute the respective actual rewards responsively to the computed sum of future discounted rewards.

Moreover, in accordance with an embodiment of the present disclosure the reinforcement learning agent is a deep-reinforcement learning agent.

Further in accordance with an embodiment of the present disclosure the reinforcement learning agent is a Q-learning model-free reinforcement learning agent.

Still further in accordance with an embodiment of the present disclosure the catheter includes a first set and a second set of electrodes, the second set of the electrodes being different from the first set of the electrodes, the system further including a first signal processing unit configured to be electrically coupled to the first set of the electrodes, and compute the respective reference tissue-proximity indications responsively to receiving at least one signal provided by the given electrode, and a second signal processing unit configured to be electrically coupled to the second set of the electrodes of the catheter, and compute the respective impedance value of the given electrode for each one of the respective states responsively to receiving the at least one signal provided by the given electrode.

Additionally in accordance with an embodiment of the present disclosure the second signal processing unit is configured to compute respective impedance values of respective ones of the second set of electrodes, the processing circuitry is configured to apply the reinforcement learning agent to find respective tissue-proximity actions to be taken that maximize respective expected rewards for the respective ones of the second set of electrodes responsively to the computed respective impedance values of the respective ones of the second set of electrodes, and provide respective derived tissue-proximity indications of proximity of the respective ones of the second set of electrodes with the tissue responsively to the found respective tissue-proximity actions to be taken for the respective ones of the second set of electrodes.

Moreover in accordance with an embodiment of the present disclosure, the system includes body surface electrodes configured to be applied to a skin surface of the living subject, the first signal processing unit being configured to be electrically coupled to the body surface electrodes, wherein the first signal processing unit is configured to compute respective impedance values between the given electrode and the body surface electrodes, and compute the respective reference tissue-proximity indications responsively to the computed respective impedance values.

There is also provided in accordance with still another embodiment of the present disclosure, a software product, including a non-transient computer-readable medium in which program instructions are stored, which instructions, when read by a central processing unit (CPU), cause the CPU to receive signals provided by electrodes, selectively reward and penalize a reinforcement learning agent over reinforcement learning exploration phases to learn at least one tissue proximity policy responsively to at least one of the received signals, apply the reinforcement learning agent in reinforcement learning exploitation phases to find respective tissue-proximity actions to be taken that maximize respective expected rewards responsively to the at least one tissue proximity policy, and provide respective derived tissue-proximity indications of proximity of a given one of the electrodes with the tissue responsively to the found respective tissue-proximity actions.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
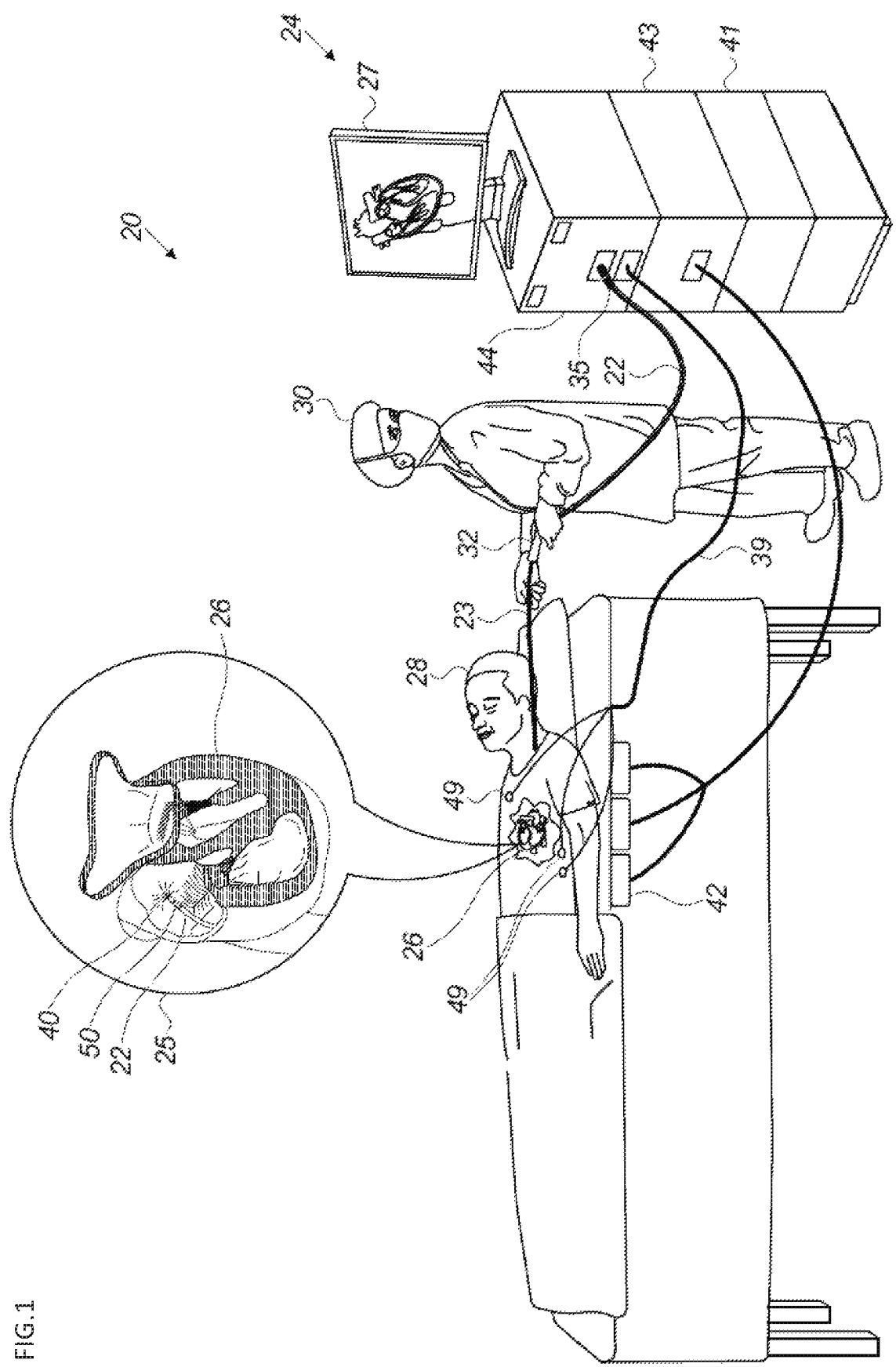
FIG. 1 is a schematic view of a medical procedure system constructed and operative in accordance with an exemplary embodiment of the present invention.

In electrophysiological (EP) labs, one or more catheters as well as body surface electrode patches may be connected to a signal processing console, which processes signals from the catheters and body surface electrodes to perform various tasks associated with mapping and ablation, by way of example.

Such signal processing consoles generally include a limited number of available input connections for connecting electrodes and sensors thereto. Additionally, catheters are being produced with increasing numbers of electrodes, in the tens or even hundreds of electrodes. For example, the Octaray™ catheter of Biosense Webster, Irvine, CA, includes 48 mapping electrodes and two position sensor electrodes as well as a magnetic sensor, all of which need to be connected to the signal processing console.

One solution is to replace the signal processing console with one with more connections. Another more acceptable solution is to provide an auxiliary signal processing unit, which connects to a sub-set of the electrodes while the other electrodes are connected to the signal processing console. The auxiliary signal processing unit processes signals received from the connected sub-set of electrodes in parallel to the processing by the signal processing console (hereinafter "the main signal processing unit"). The output of the main signal processing unit and the auxiliary signal processing unit may then be processed by another processing device which performs such tasks as mapping, ablation control, and rendering of user interfaces etc.

One problem with the above solution relates to the computation of tissue proximity indicators (TPIs) which provide a measure of proximity of individual catheter electrodes to tissue in a body part (e.g., in a heart chamber). The main signal processing unit may process TPIs in a different way to the auxiliary signal processing unit. For example, TPIs may be computed based on impedance values which are found based on impedance between catheter electrodes and the body surface electrodes. As the body surface electrodes are connected to the main signal processing unit and not to the auxiliary signal processing unit, the main signal processing unit may compute TPIs based on the impedance between catheter electrodes and the body surface electrodes, while the auxiliary signal processing unit may compute TPIs based on bipolar impedance measured between various pairs of the catheter electrodes. The TPIs computed based on the bipolar impedance may be different than those computed by the main signal processing unit, even for the same electrodes, and possibly provide inferior results. In some examples, the main signal processing unit and the auxiliary signal processing unit may include different processing hardware which may also lead to different qualities of computed TPIs.

Embodiments of the present invention solve the above problems by using reinforcement learning (e.g., Q learning, Deep Q learning) to derive TPIs for electrodes only connected to the auxiliary signal processing unit based on TPIs computed in the main signal processing unit thereby providing similar results for the electrodes only connected to the auxiliary signal processing unit.

One or more catheter electrodes (e.g., electrode A) are connected to both the main and auxiliary signal processing unit and may be used to calibrate the TPIs computed for the catheter electrodes only connected to the auxiliary signal processing unit. The auxiliary signal processing unit computes an impedance value for electrode A (e.g., based on a bipolar signal) and the main signal processing unit computes a TPI for electrode A (e.g., based on an impedance value between electrode A and body surface electrodes). A processing device receives the impedance value computed by the auxiliary signal processing unit and the TPI from the main signal processing unit. The processing device applies a reinforcement learning agent in an exploitation phase and rewards or penalizes the agent in an exploration phase as described in more detail below. The processing device performs subsequent exploitation and exploration phases responsively to new impedance values and TPIs and the agent is continually trained between exploitation phases.

Other electrodes (e.g., electrode B) are only connected to the auxiliary signal processing box, which computes impedance values for those electrodes. The processing device then applies the agent in exploitation phases to determines TPIs for those electrodes based on inputting a state (e.g., the impedance value received from the auxiliary signal processing unit for electrode B, and the previously provided state of contact of electrode B (e.g., in contact or not in contact) and an action (e.g., to change the TPI from the previously provided TPI or not) yielding a first expected reward for that action. The same state, but opposite action, is inputted to the agent to yield a second expected reward for that action. The action associated with the highest reward is selected and that action is taken.

The agent may be trained (in exploration phases) using impedance data from the auxiliary signal processing unit and the TPI results from the main signal processing unit. An actual reward is computed based on whether the last action taken is consistent with the received TPI of electrode A from the main signal processing unit. The actual reward may be computed as the sum of future discounted rewards. The agent is then trained based on the actual reward by rewarding and penalizing the agent. If the last action taken is consistent with the TPI computed by the main signal processing unit then the agent is rewarded (e.g., the actual reward may be equal to +1). If the last action taken is inconsistent with the TPI computed by the main signal processing unit then the agent is penalized (e.g., the actual reward may be equal to −1). In some cases, the reward function may be discounted.

The state and the last action taken in the last exploitation of electrode A may be input to the agent yielding an expected reward (e.g., having a value between −1 and +1). The parameters of the agent may be iteratively changed until the expected reward (i.e., the actual output of the agent) is close enough to the actual reward (i.e., desired output of the agent). The comparison of the actual output of the agent and desired output may be performed using a suitable loss function.

System Description

Figure 2:
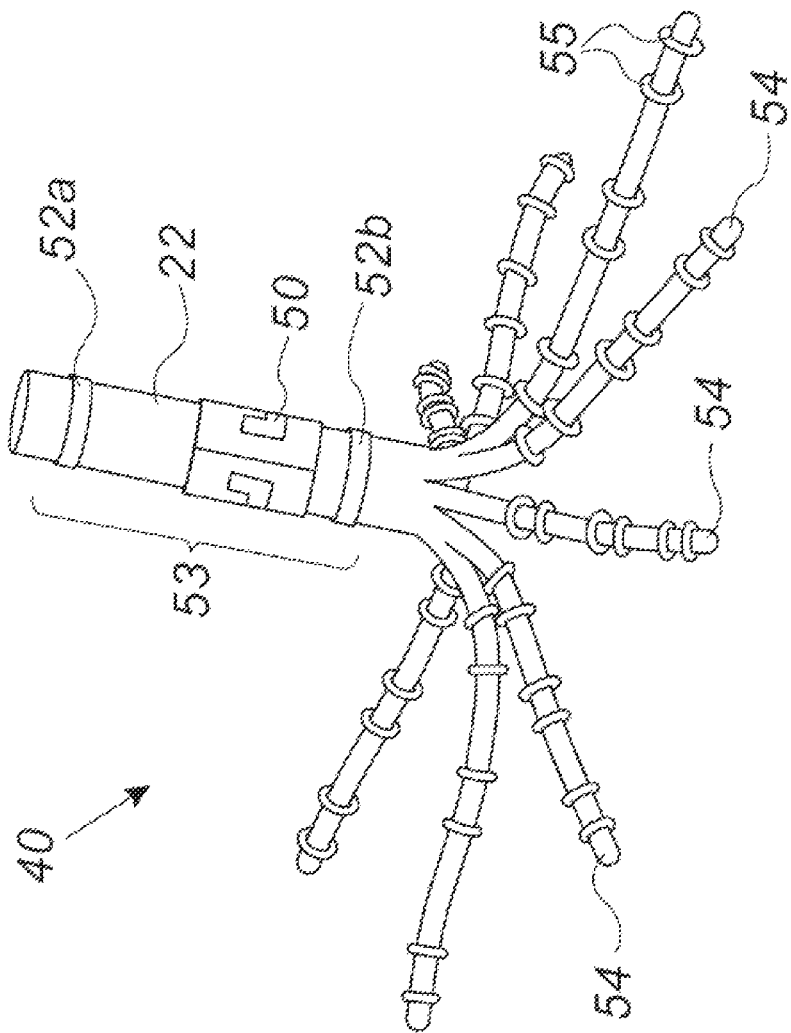
FIG. 2 is a schematic view of a catheter for use in the system of FIG. 1.

Reference is now made to FIG. 1, which is a schematic view of a medical procedure system 20 constructed and operative in accordance with an embodiment of the present invention. Reference is also made to FIG. 2, which is a schematic view of a catheter 40 for use in the system 20 of FIG. 1.

The medical procedure system 20 is used to determine the position of the catheter 40, seen in an inset 25 of FIG. 1 and in more detail in FIG. 2. The catheter 40 includes a shaft 22 and a plurality of deflectable arms 54 (only some labeled for the sake of simplicity) for inserting into a body-part of a living subject. The deflectable arms 54 have respective proximal ends connected to the distal end of the shaft 22.

The catheter 40 includes a position sensor 53 disposed on the shaft 22 in a predefined spatial relation to the proximal ends of the deflectable arms 54. The position sensor 53 may include a magnetic sensor 50 and/or at least one shaft electrode 52. The magnetic sensor 50 may include at least one coil, for example, but not limited to, a dual-axis or a triple axis coil arrangement to provide position data for location and orientation including roll. The catheter 40 includes multiple electrodes 55 (only some are labeled in FIG. 2 for the sake of simplicity) disposed at different, respective locations along each of the deflectable arms 54. Typically, the catheter 40 may be used for mapping electrical activity in a heart of the living subject using the electrodes 55, or for performing any other suitable function in a body-part of a living subject.

The medical procedure system 20 may determine a position and orientation of the shaft 22 of the catheter 40 based on signals provided by the magnetic sensor 50 and/or the shaft electrodes 52 (proximal-electrode 52a and distal-electrode 52b) fitted on the shaft 22, on either side of the magnetic sensor 50. The proximal-electrode 52a, the distal-electrode 52b, the magnetic sensor 50 and at least some of the electrodes 55 are connected by wires running through the shaft 22 via a catheter connector or connectors 35 to various driver circuitries in a console 24. In some embodiments, at least two of the electrodes 55 of each of the deflectable arms 54, the shaft electrodes 52, and the magnetic sensor 50 are connected to the driver circuitries in the console 24 via the catheter connector 35. In some embodiments, the distal electrode 52b and/or the proximal electrode 52a may be omitted.

The illustration shown in FIG. 2 is chosen purely for the sake of conceptual clarity. Other configurations of shaft electrodes 52 and electrodes 55 are possible. Additional functionalities may be included in the position sensor 53. Elements which are not relevant to the disclosed embodiments of the invention, such as irrigation ports, are omitted for the sake of clarity.

A physician 30 navigates the catheter 40 to a target location in a body part (e.g., a heart 26) of a patient 28 by manipulating the shaft 22 using a manipulator 32 near the proximal end of the catheter 40 and/or deflection from a sheath 23. The catheter 40 is inserted through the sheath 23, with the deflectable arms 54 gathered together, and only after the catheter 40 is retracted from the sheath 23, the deflectable arms 54 are able to spread and regain their intended functional shape. By containing deflectable arms 54 together, the sheath 23 also serves to minimize vascular trauma on its way to the target location.

Console 24 comprises processing circuitry 41, typically a general-purpose computer and a suitable front end and interface circuits 44 for generating signals in, and/or receiving signals from, body surface electrodes 49 which are attached by wires running through a cable 39 to the chest and to the back, or any other suitable skin surface, of the patient 28.

Console 24 further comprises a magnetic-sensing subsystem. The patient 28 is placed in a magnetic field generated by a pad containing at least one magnetic field radiator 42, which is driven by a unit 43 disposed in the console 24. The magnetic field radiator(s) 42 is configured to transmit alternating magnetic fields into a region where the body-part (e.g., the heart 26) is located. The magnetic fields generated by the magnetic field radiator(s) 42 generate direction signals in the magnetic sensor 50. The magnetic sensor 50 is configured to detect at least part of the transmitted alternating magnetic fields and provide the direction signals as corresponding electrical inputs to the processing circuitry 41.

In some embodiments, the processing circuitry 41 uses the position-signals received from the shaft electrodes 52, the magnetic sensor 50 and the electrodes 55 to estimate a position of the catheter 40 inside an organ, such as inside a cardiac chamber. In some embodiments, the processing circuitry 41 correlates the position signals received from the electrodes 52, 55 with previously acquired magnetic location-calibrated position signals, to estimate the position of the catheter 40 inside a cardiac chamber. The position coordinates of the shaft electrodes 52 and the electrodes 55 may be determined by the processing circuitry 41 based on, among other inputs, measured impedances, or on proportions of currents distribution, between the electrodes 52, 55 and the body surface electrodes 49. The console 24 drives a display 27, which shows the distal end of the catheter 40 inside the heart 26.

The method of position sensing using current distribution measurements and/or external magnetic fields is implemented in various medical applications, for example, in the Carto® system, produced by Biosense Webster Inc. (Irvine, California), and is described in detail in U.S. Pat. Nos. 5,391,199, 6,690,963, 6,484,118, 6,239,724, 6,618,612, 6,332,089, 7,756,576, 7,869,865, and 7,848,787, in PCT Patent Publication WO 96/05768, and in U.S. Patent Application Publications 2002/0065455 A1, 2003/0120150 A1 and 2004/0068178 A1.

The Carto®3 system applies an Active Current Location (ACL) impedance-based position-tracking method. In some embodiments, using the ACL method, the processing circuitry 41 is configured to create a mapping (e.g., current-position matrix (CPM)) between indications of electrical impedance and positions in a magnetic coordinate frame of the magnetic field radiator(s) 42. The processing circuitry 41 estimates the positions of the shaft electrodes 52 and the electrodes 55 by performing a lookup in the CPM.

Processing circuitry 41 is typically programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

FIG. 1 shows only elements related to the disclosed techniques, for the sake of simplicity and clarity. The system 20 typically comprises additional modules and elements that are not directly related to the disclosed techniques, and thus are intentionally omitted from FIG. 1 and from the corresponding description.

The catheter 40 described above includes eight deflectable arms 54 with six electrodes per arm 54. Any suitable catheter may be used instead of the catheter 40 to perform the functions described above and hereinbelow, for example, a catheter with a different number of flexible arms and/or electrodes per arm, or a different distal end type such as a balloon catheter, basket catheter, or a lasso catheter, by way of example only.

The medical procedure system 20 may also perform ablation of heart tissue using any suitable catheter, for example using the catheter 40 or a different catheter and any suitable ablation method. The console 24 may include an RF signal generator (not shown) configured to generate RF power to be applied by an electrode or electrodes of a catheter connected to the console 24, and one or more of the body surface electrodes 49, to ablate a myocardium of the heart 26. The console 24 may include a pump (not shown), which pumps irrigation fluid into an irrigation channel to a distal end of a catheter performing ablation. The catheter performing the ablation may also include temperature sensors (not shown) which are used to measure a temperature of the myocardium during ablation and regulate an ablation power and/or an irrigation rate of the pumping of the irrigation fluid according to the measured temperature.

Figure 3:
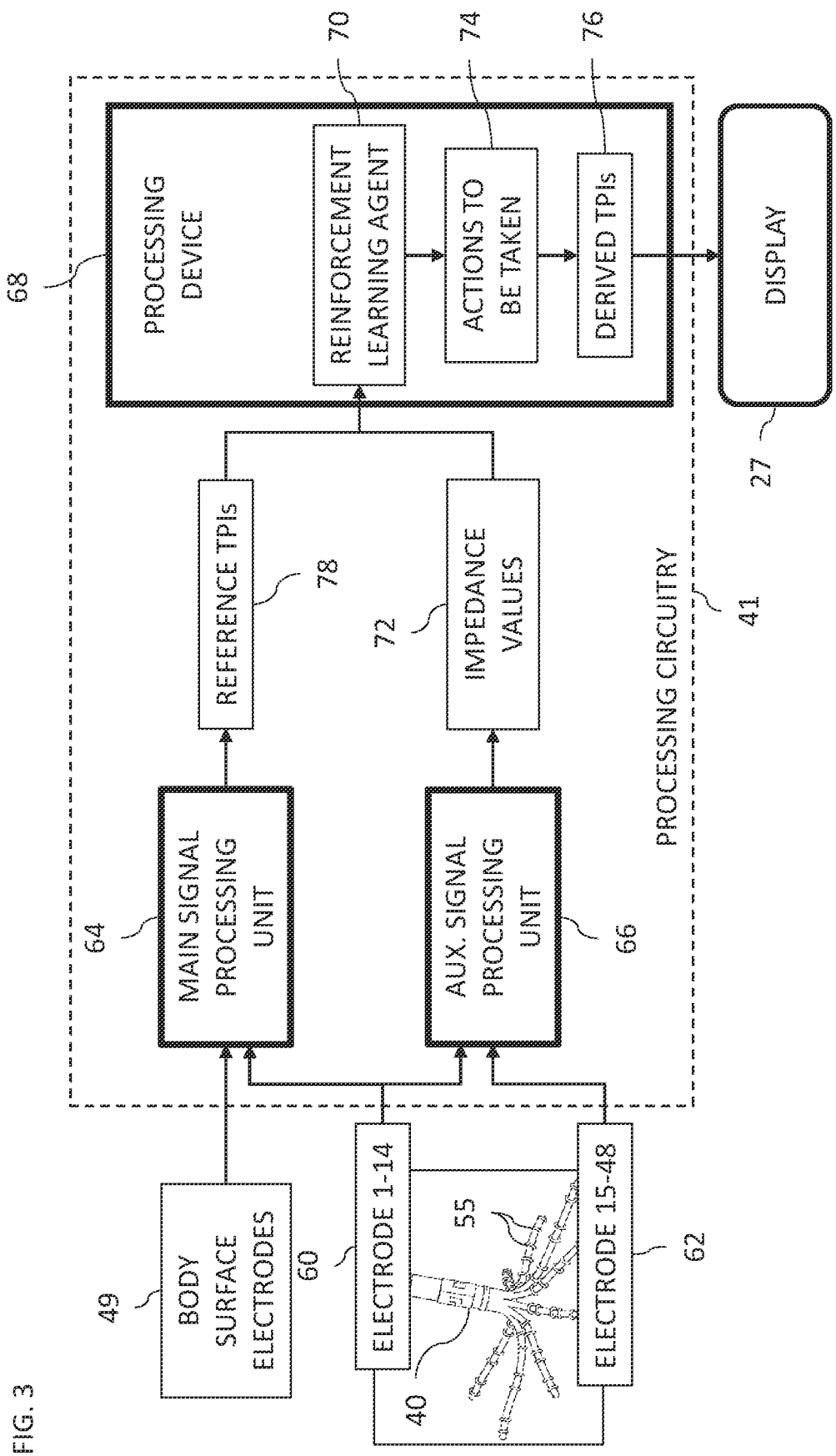
FIG. 3 is a schematic view of elements of the system of FIG. 1 performing reinforcement learning.
Figure 4:
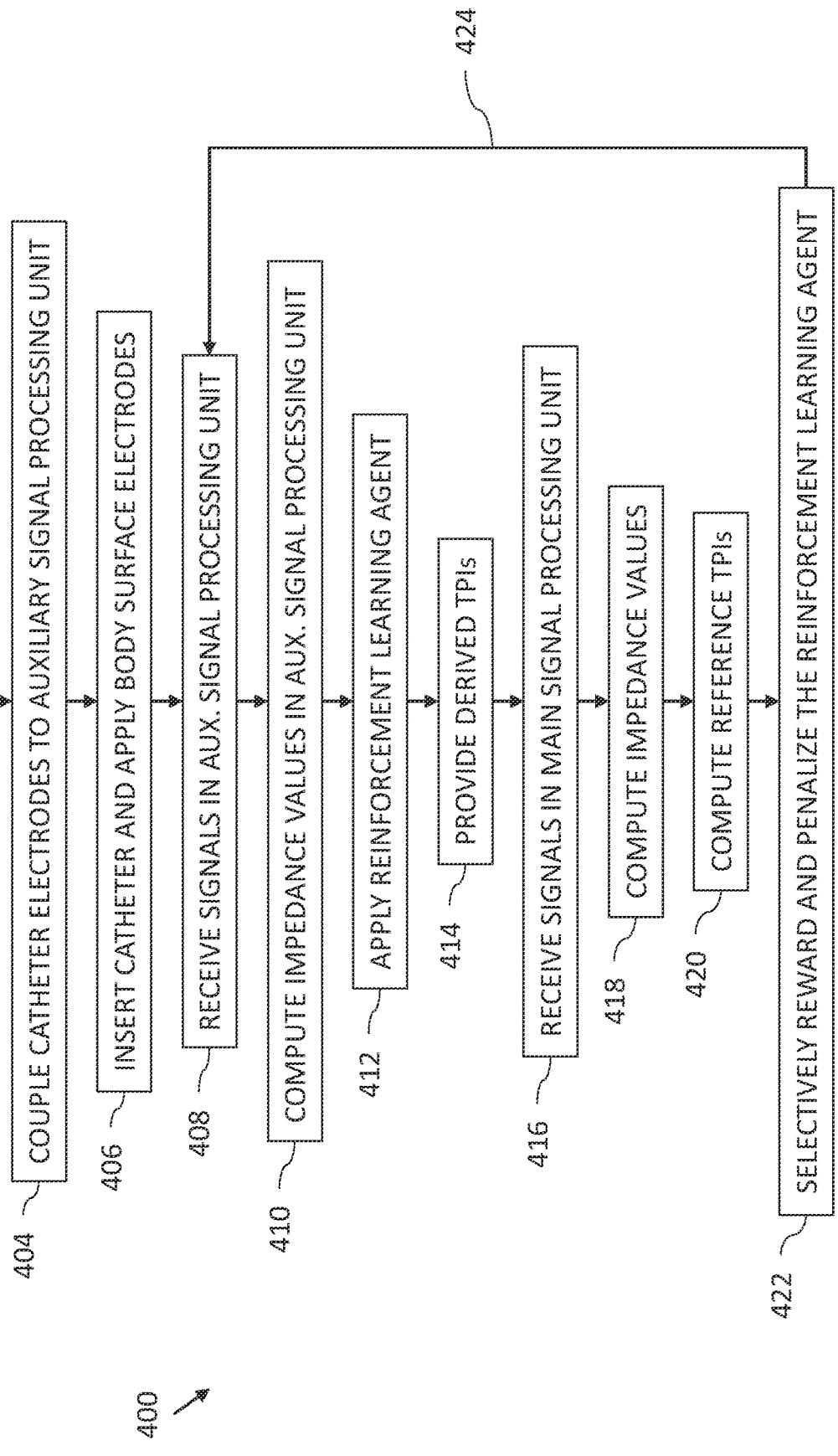
FIG. 4 is a flowchart including steps in a method of performing reinforcement learning for use in the system of FIG. 1.

Reference is now made to FIGS. 3 and 4. FIG. 3 is a schematic view of elements of the system 20 of FIG. 1 performing reinforcement learning. FIG. 4 is a flowchart 400 including steps in a method of performing reinforcement learning for use in the system 20 of FIG. 1.

The catheter 40 includes a first set 60 and a second set 62 of electrodes 55. The first set 60 is different from the second set 62. For example, the first set 60 includes electrodes 1 to 14 and the second set 62 includes electrodes 15 to 48. The electrodes 55 have been described as being divided into two sets for the sake of simplicity in explaining how the electrodes 55 may be connected to different processing devices and the two sets does not necessarily reflect how the electrodes 55 are positioned on the catheter 40.

The processing circuitry 41 includes a main signal processing unit 64, an auxiliary signal processing unit 66, and a processing device 68. Each of the main signal processing unit 64 and the auxiliary signal processing unit 66 may include respective signal processing circuits, e.g., an analog to digital converter, noise reduction circuitry and other filtering circuitry. The main signal processing unit 64 is configured to be electrically coupled (block 402) to the first set 60 of electrodes 55 and optionally the body surface electrodes 49. The auxiliary signal processing unit 66 is configured to be electrically coupled (block 404) to the second set 62 of electrodes 55. In order to train a reinforcement learning agent 70, one or more of the electrodes 55 of the first set 60 of electrodes is also coupled to the auxiliary signal processing unit 66. For the sake of simplicity of explanation, in the description provided below, it will be assumed that electrode 1 of the first set 60 of electrodes 55 is also coupled to the auxiliary signal processing unit 66. However, in practice more than one of the first set 60 of electrodes 55 may be coupled to the auxiliary signal processing unit 66 and provide data for training the reinforcement learning agent 70. Therefore, when the description below refers to electrode 1, the same or similar processing may also be performed for one or more of the electrodes 55 in the first set 60.

The catheter 40 is configured to be inserted (block 406) into a body part (e.g., the heart 26 of FIG. 1) of a living subject (e.g., the patient 28 of FIG. 1). The electrodes 55 are configured to contact tissue at respective locations within the body part. The body surface electrodes 49 are configured to be applied to a skin surface of the living subject.

The auxiliary signal processing unit 66 is configured to receive signals (block 408) from the second set 62 of electrodes 55 and electrode 1 of the first set 60 of electrodes 55 of the catheter 40. The auxiliary signal processing unit 66 is configured to compute (block 410) respective impedance values 72 of electrode 1 over time responsively to receiving at least one signal provided by electrode 1. The signal provided by an electrode (e.g., electrode 1) may be received directly from that electrode via wiring in the catheter 40 to the console 24 or via signals detected by the body surface electrodes 49 emitted from that electrode (e.g., electrode 1). The auxiliary signal processing unit 66 is also configured to compute respective impedance values of respective ones of the second set 62 of electrodes 55.

As previously mentioned, each exploration phase follows an exploitation phase. For example, the reinforcement learning agent 70 is first applied to find an action to be taken in an exploitation phase, and then the reinforcement learning agent 70 is rewarded or penalized in an exploration phase based on the action taken in the latest exploitation phase. Therefore, applying the reinforcement learning agent 70 in exploitation phases is described first followed by rewarding and penalizing the reinforcement learning agent 70 in exploration phases. Initially, the parameters of the reinforcement learning agent 70 are initialized (e.g., randomized) and the parameters are changed over successive exploitation and exploration phases while the reinforcement learning agent 70 is learning how to follow TPIs computed by the main signal processing unit 64.

The processing device 68 is configured to receive the impedance values 72 of electrode 1 and respective electrodes 55 of the second set 62 from the auxiliary signal processing unit 66.

The processing device 68 is configured to apply (block 412) the reinforcement learning agent 70 in reinforcement learning exploitation phases to find respective tissue-proximity actions to be taken 74 that maximize respective expected rewards for electrode 1, responsively to at least one tissue proximity policy. The step of block 412 is described in more detail with reference to FIGS. 5 and 6.

Similarly, the processing device 68 is configured to apply the reinforcement learning agent 70 to find respective tissue-proximity actions to be taken 74 that maximize respective expected rewards for the respective electrodes 55 of the second set 62 responsively to the computed respective impedance values of the respective electrodes 55 of the second set 62.

The processing device 68 is configured to provide (block 414) respective derived tissue-proximity indications (TPIs) 76 of proximity of electrode 1 with the tissue responsively to the found respective tissue-proximity actions 74 of electrode 1. For example, if the tissue-proximity action to be taken 74 is to change the TPI from the previously provided TPI, and the previous TPI was equal to "in-contact", the current TPI will be "not-in-contact". If the tissue-proximity action to be taken 74 is not to change the TPI from the previously provided TPI, and the previous TPI was equal to "in-contact", the current TPI will be "in-contact".

Similarly, the processing device 68 is configured to provide respective derived tissue-proximity indications 76 of proximity of the respective electrodes 55 of the second set 62 with the tissue responsively to the found respective tissue-proximity actions to be taken 74 of the respective electrodes 55 of the second set 62. The processing device 68 is configured to render to the display 27 the derived TPIs 76 of electrode 1 and the respective electrodes 55 of the second set 62.

The main signal processing unit 64 is configured to receive signals (block 416) from the first set 60 of electrodes 55 of the catheter 40 and the body surface electrodes 49. The main signal processing unit 64 is configured to compute (block 418) respective impedance values over time between electrode 1 and the body surface electrodes 49 responsively to the received signals. In other embodiments, the impedance values may be computed using any suitable method, for example, based on bipolar signals. The main signal processing unit 64 is generally configured to compute impedance values over time for other electrodes 55 of the first set 60.

The main signal processing unit 64 is configured to compute (block 420) respective reference tissue-proximity indications (TPIs) 78 responsively to the computed respective impedance values of electrode 1 (i.e., responsively to receiving at least one signal provided by electrode 1). The reference TPIs 78 are described as "reference" TPIs as they may be used as a reference of quality when training the reinforcement learning agent 70. The main signal processing unit 64 is configured to compute the respective reference tissue-proximity indications 78 independently of applying the reinforcement learning agent 70 and responsively to at least one of the received signals (which are used to compute the impedance values of electrode 1). Similarly, the main signal processing unit 64 is configured to compute reference TPIs for other ones of the first set 60 of electrodes 55. The steps of blocks 402 to 420 may be performed in any suitable order.

The processing device 68 is configured to selectively reward and penalize (block 422) the reinforcement learning agent 70 over reinforcement learning exploration phases to learn the tissue proximity policy (or policies) responsively to data including the reference TPIs 78, the impedance values 72 and other data (e.g., states, actions taken, and actual rewards) described in more detail with reference to FIGS. 7 and 8. In each reinforcement learning exploration phase, the processing device 68 is configured to either reward or penalize the reinforcement learning agent 70. The data (including the reference TPIs 78, and the impedance values 72) is computed responsively to at least one of the signals received from the electrodes 55 and the body surface electrodes 49 as described above. The steps of blocks 408 to 422 are repeated (arrow 424) for subsequent exploitation and exploration phases.

In some embodiments, the reinforcement learning agent 70 is a deep-reinforcement learning agent. Deep reinforcement learning uses a deep neural network incorporating deep learning into the solution allowing agents to make decisions from unstructured input data without manual engineering of state spaces. In other embodiments, the reinforcement learning agent 70 is a Q-learning model-free reinforcement learning agent. Q-learning is model-free (does not require a model of the environment) and can solve problems with random transitions and rewards. Any suitable reinforcement learning algorithm, for example, Monte Carlo, SARSA, Q-learning—Lambda, SARSA—Lambda, DQN, DDPG, A3C, NAF, TRPO, PPO, TD3, or SAC.

In practice, some or all of the functions of the processing circuitry 41 may be combined in a single physical component or, alternatively, implemented using multiple physical components. These physical components may comprise hard-wired or programmable devices, or a combination of the two. In some embodiments, at least some of the functions of the processing circuitry 41 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 5:
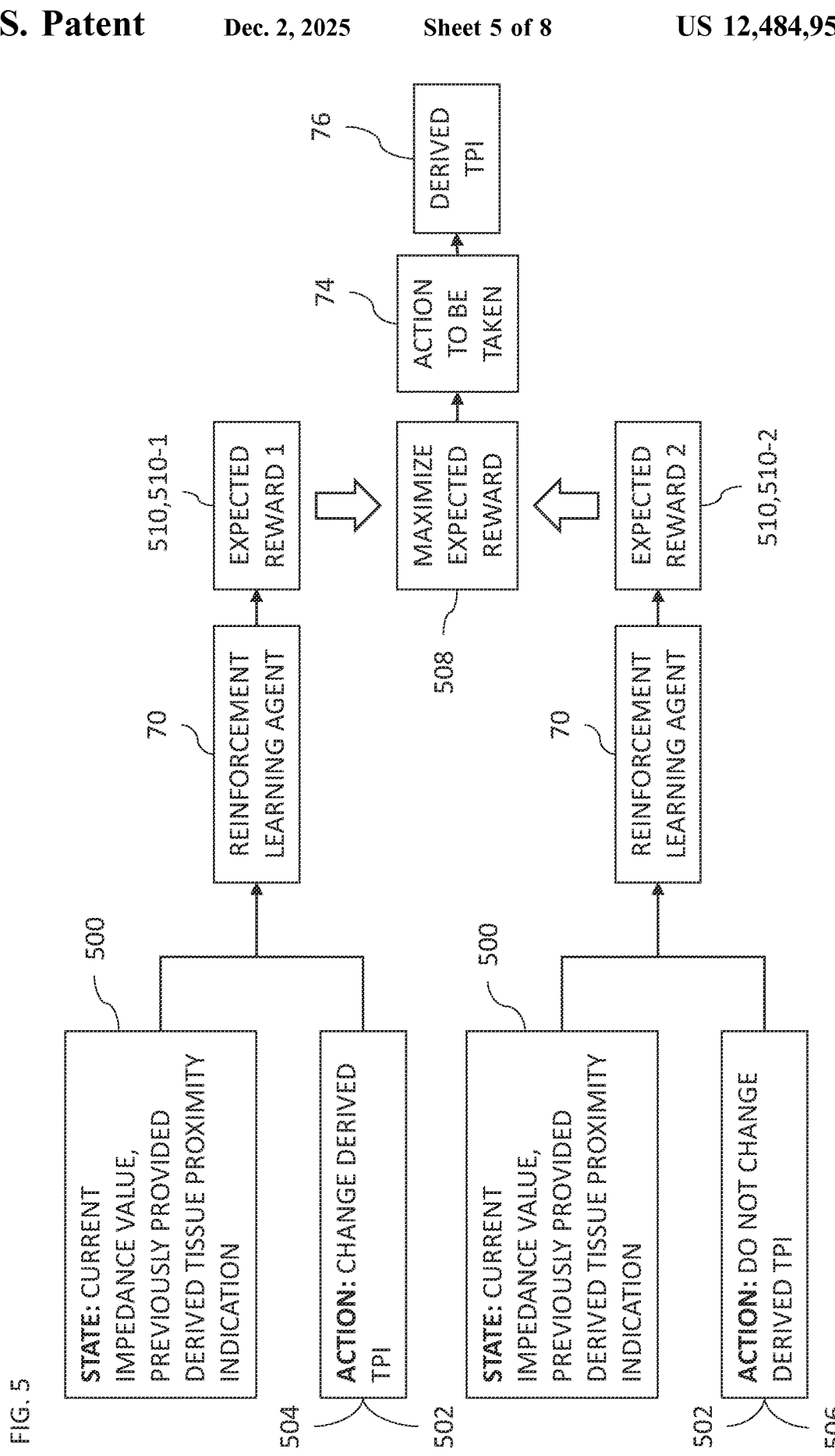
FIG. 5 is a schematic view illustrating an exploitation phase of reinforcement learning for use in the system of FIG. 1.
Figure 6:
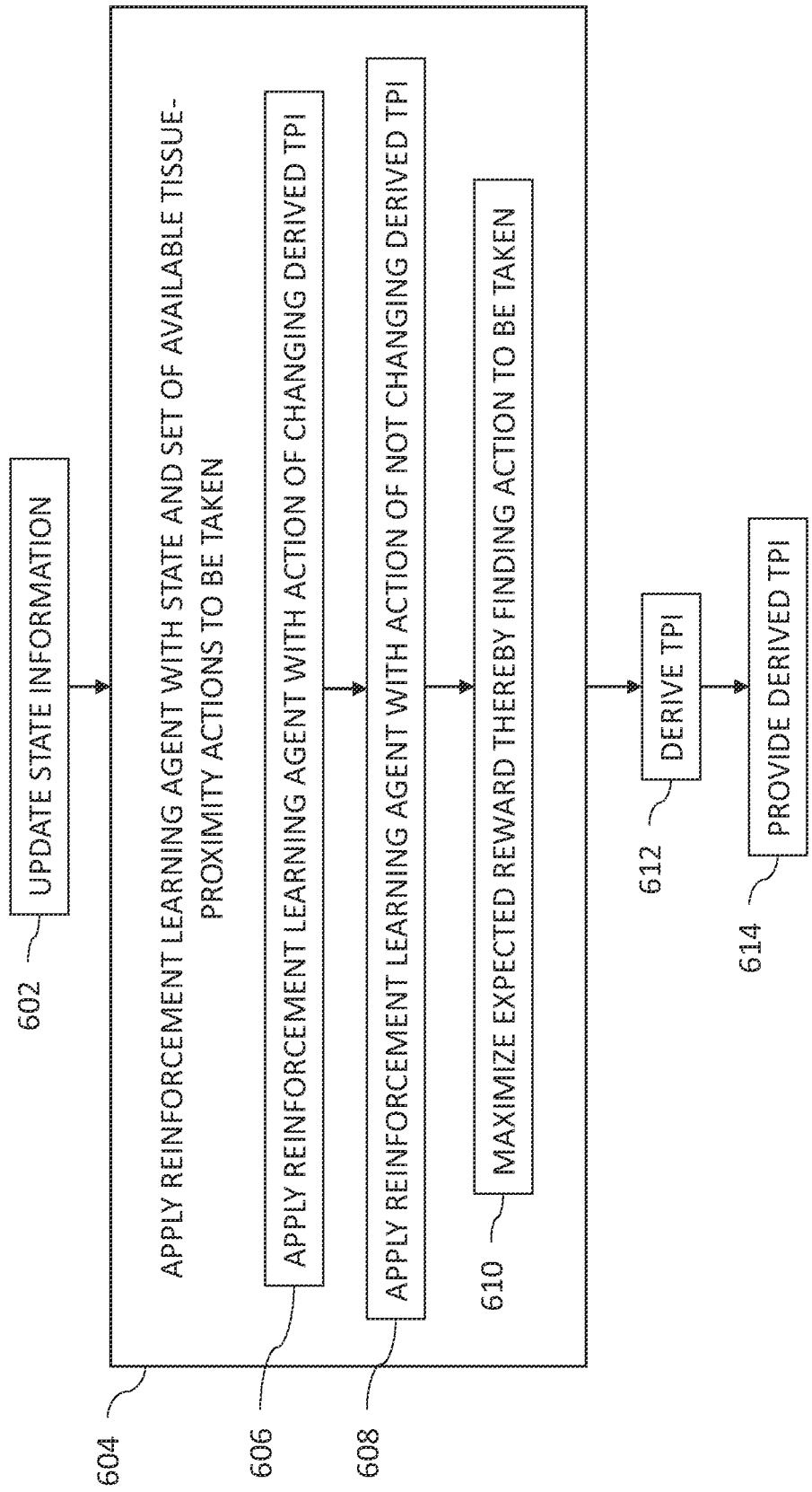
FIG. 6 is a flowchart including steps performed in the exploitation phase of FIG. 5.

Reference is now made to FIGS. 5 and 6. FIG. 5 is a schematic view illustrating an exploitation phase of reinforcement learning for use in the system 20 of FIG. 1. FIG. 6 is a flowchart 600 including steps performed in the exploitation phase of FIG. 5.

Each of the exploitation phases has an associated state 500 which is used as input to the reinforcement learning agent 70 along with a set of different available tissue-proximity actions to be taken 502 for that phase. Each respective state 500 includes: the respective derived tissue-proximity indication 76 (FIG. 3) of electrode 1 provided in the respective last reinforcement learning exploitation phase; and the respective impedance value 72 (FIG. 3) of electrode 1 computed for the current respective reinforcement learning exploitation phase. Each set of available tissue-proximity actions to be taken 502 includes: changing the derived tissue-proximity indication 76 of electrode 1 provided in the last reinforcement learning exploitation phase (block 504); and not changing the derived tissue-proximity indication 76 of electrode 1 provided in the last reinforcement learning exploitation phase (block 506). The processing device 68 is configured to update (block 602) the state 500 responsively to the current impedance value 72 of electrode 1, and the last provided derived TPI 76 of electrode 1 (of the previous exploitation phase). In the initial exploitation phase, the last provided derived TPI 76 of electrode 1 may be set to an initial value, e.g., not-in-contact.

The processing device 68 is configured to apply (block 604) the reinforcement learning agent 70 in respective reinforcement learning exploitation phases to find respective tissue-proximity actions to be taken 74 of electrode 1 that maximize (block 508) respective expected rewards (blocks 510) responsively to respective states 500 of the reinforcement learning agent 70 for electrode 1 and respective sets of available tissue-proximity actions to be taken 502 for electrode 1.

In one exploitation phase, the processing device 68 is configured to: apply (block 606) the reinforcement learning agent 70 with the state 500 and an action to change the derived TPI (block 504) of electrode 1 yielding an expected reward 510-1; apply (block 608) the reinforcement learning agent 70 with the state 500 and an action not to change the derived TPI (block 506) of electrode 1 yielding an expected reward 510-2; and maximize (blocks 508, 610) the expected reward 510 by selecting the tissue-proximity action to be taken 502 (for electrode 1) resulting in the maximum expected reward 510 (e.g., from the expected reward 510-1 and 510-2) yielding the tissue-proximity action to be taken 74 (e.g., change the TPI or do not change the TPI) for electrode 1. The processing device 68 is configured to derive (block 612) the TPI 76 of electrode 1 from the tissue-proximity action to be taken 74 and provide (block 614) the derived TPI 76 of electrode 1 to the physician 30 (e.g., by rendering the derived TPI 76 of electrode 1 to the display 27 (FIG. 1)).

The processing device 68 is configured to perform the above steps of blocks 602 to 614 for other electrodes 55 (e.g., of the second set 62 and optionally at least one other electrode 55 of the first set 60) connected to the auxiliary signal processing unit 66 (FIG. 3).

Figure 7:
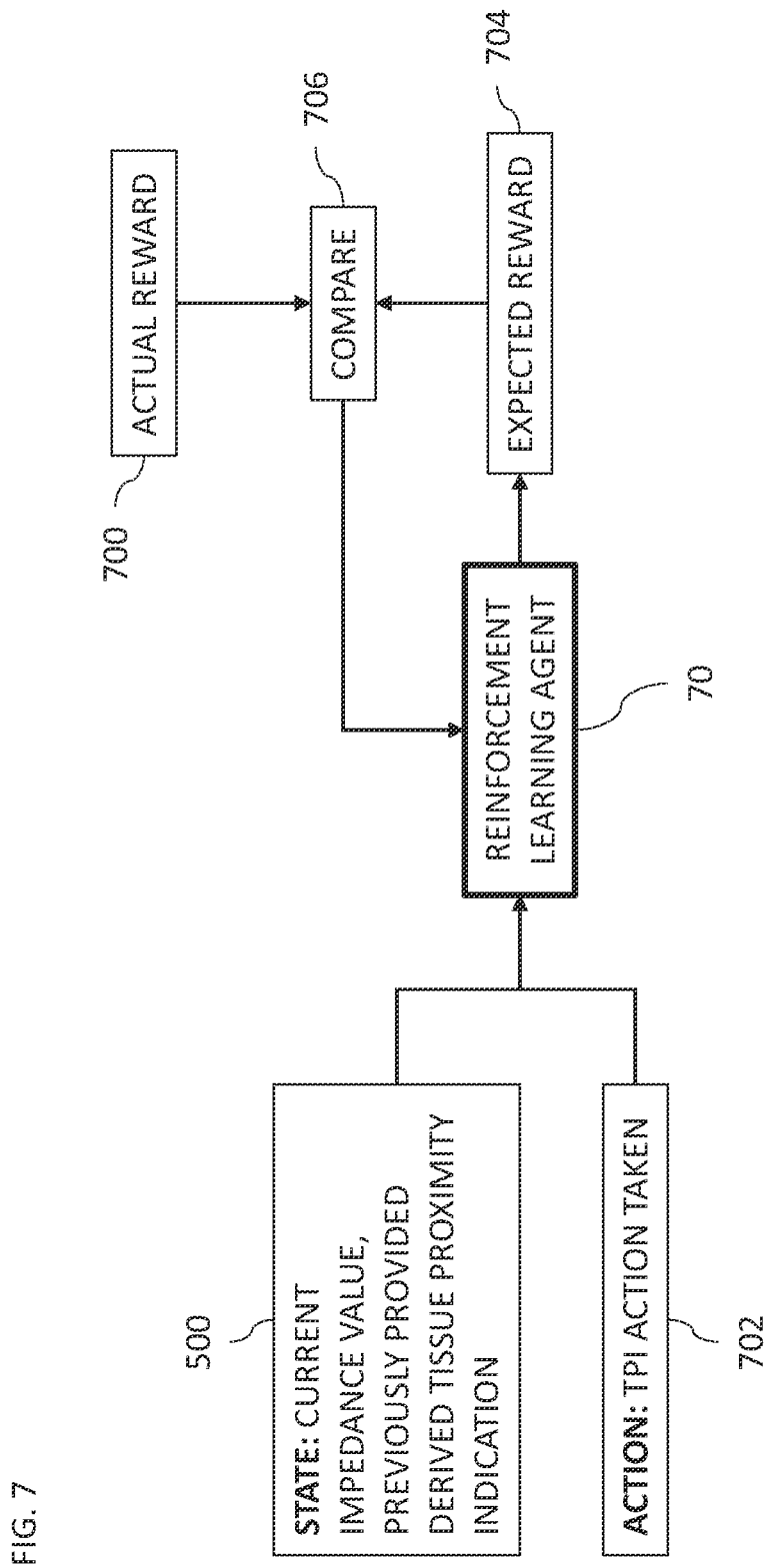
FIG. 7 is a schematic view illustrating an exploration phase of the reinforcement learning for use in the system of FIG. 1.
Figure 8:
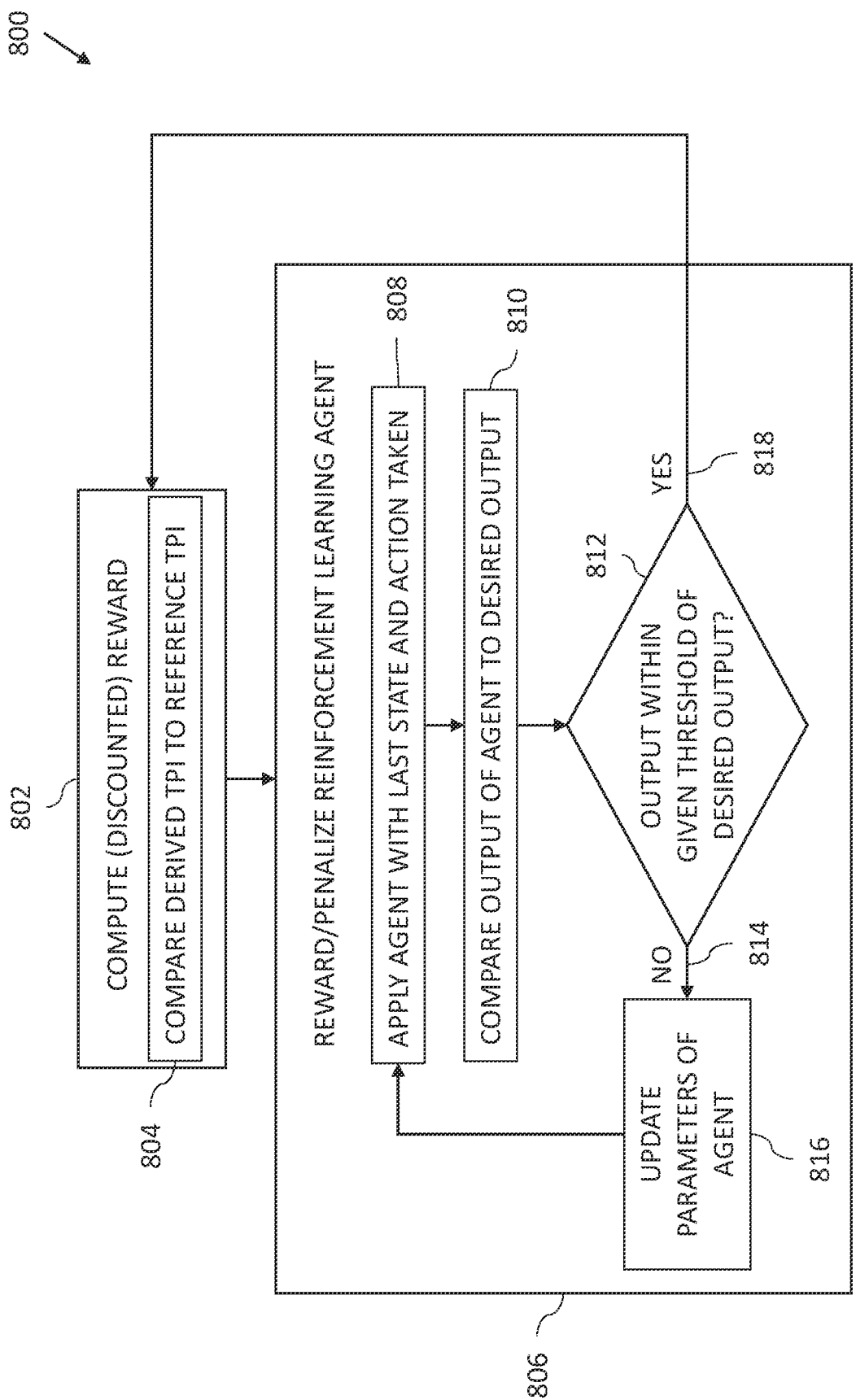
FIG. 8 is a flowchart including steps performed in the exploration phase of FIG. 7.

Reference is now made to FIGS. 7 and 8. FIG. 7 is a schematic view illustrating an exploration phase of the reinforcement learning for use in the system 20 of FIG. 1. FIG. 8 is a flowchart 800 including steps performed in the exploration phase of FIG. 7.

The processing device 68 is configured to compute (block 802) respective actual rewards 700 of electrode 1 for use in respective exploration phases, responsively to the respective found tissue-proximity actions to be taken 74 (FIG. 5) (i.e., the tissue-proximity action to be taken 74 found in the last exploitation phase is used in the current exploration phase) and the respective reference tissue-proximity indications 78 (i.e., computed based on impedance data from the last exploitation phase) of electrode 1 that were computed by the main signal processing unit 64 independently of applying the reinforcement learning agent 70. In some embodiments, the processing device 68 is configured to: compute a sum of future discounted rewards; and compute the respective actual rewards 700 responsively to the computed sum of future discounted rewards. The step of block 802 may include the processing device 68 being configured to compare (block 804), the derived TPI 76 (FIG. 3) (derived in the last exploitation phase) to the reference TPI 78 (FIG. 3) (computed based on impedance data of the last exploitation phase) for each respective exploration phase. If the derived TPI 76 of electrode 1 for one of the exploration phases is the same as the reference TPI 78 of electrode 1 for that exploration phase, the actual reward may be equal to a high value, e.g., +1, and if the derived TPI 76 is not the same as the reference TPI 78 for electrode 1 for that exploration phase, the actual reward may be equal to a low value, e.g., −1.

The processing device 68 is configured to selectively reward and penalize (block 806) the reinforcement learning agent 70 over the reinforcement learning exploration phases responsively to data of respective last ones of the reinforcement learning exploitation phases. In other words, the data used in each exploration phase is from the last exploitation phase prior to that exploration phase. The data for each respective exploitation phase includes: a respective one of the states 500 (i.e., the state 500 in the respective last exploitation phase), the respective found tissue-proximity actions to be taken 74 (FIG. 5) in the respective last exploitation phase, and the respective actual reward for the action taken (i.e., the found action to be taken) in the respective last exploitation phase.

In one of the exploration phases, the processing device 68 is configured to: apply (block 808) the reinforcement learning agent 70 with the last state 500 and action taken 702 (i.e. the found tissue-proximity actions to be taken 74 in the last exploitation phase); compare (blocks 706, 810) an actual output (e.g., the expected reward 704) of the reinforcement learning agent 70 to a desired output (e.g., the actual reward 700 for use in this exploration phase computed in the step of block 802) for example using any suitable loss function; at a decision block 812 determine if the actual output is within a given threshold of the desire output, and if the actual output is not within the given threshold (branch 814), the processing device 68 is configured to update (block 816) parameters (e.g., weights) of the reinforcement learning agent 70 and continue with the step of block 808; and if the actual output is within the given threshold (branch 818) continue with the step of block 802 for the next exploration phase. The processing device 68 is configured to update the parameters using any suitable optimization algorithm, for example, a gradient descent algorithm such as Adam Optimization.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±20% of the recited value, e.g., "about 90%" may refer to the range of values from 72% to 108%.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A computer-implemented method to find tissue proximity indications, performed when a catheter is inserted into a body part of a living subject such that electrodes of the catheter contact tissue at respective locations within the body part, the method comprising steps performed by a processor comprising:

receiving signals detected by the electrodes;

selectively rewarding and penalizing a reinforcement learning agent over reinforcement learning exploration phases to learn at least one tissue proximity policy responsively to at least one of the received detected signals;

applying the reinforcement learning agent in reinforcement learning exploitation phases to find respective tissue-proximity actions to be taken that maximize respective expected rewards responsively to the at least one tissue proximity policy, the applying includes applying the reinforcement learning agent in respective ones of the reinforcement learning exploitation phases to find respective ones of the tissue-proximity actions to be taken that maximize respective expected rewards responsively to respective states of the reinforcement learning agent and respective sets of available tissue-proximity actions to be taken;

providing respective derived tissue-proximity indications of proximity of a given one of the electrodes with the tissue responsively to the found respective tissue-proximity actions, wherein the selectively rewarding and penalizing includes selectively rewarding and penalizing the reinforcement learning agent over the reinforcement learning exploration phases responsively to data of respective last ones of the reinforcement learning exploitation phases, the data comprising: respective ones of the states, respective found ones of the tissue-proximity actions to be taken, and respective actual rewards;

the method further comprising:

computing the respective impedance value of the given electrode for each one of the respective states responsively to at least one of the received detected signals;

computing the respective reference tissue-proximity indications independently of applying the reinforcement learning agent responsively to at least one of the received detected signals;

configuring a first set of the electrodes of the catheter to be electrically coupled to a first signal processing unit, wherein the computing the respective reference tissue-proximity indications is performed by the first signal processing unit responsively to receiving at least one signal provided by the given electrode;

configuring a second set of the electrodes of the catheter and the given electrode to be electrically coupled to a second signal processing unit, the second set of the electrodes being different from the first set of the electrodes, the given electrode being in the first set of the electrodes, wherein the computing the respective impedance value of the given electrode for each one of the respective states is performed in the second signal processing unit responsively to receiving the at least one signal provided by the given electrode, the first signal processing unit and the second signal processing unit providing input connections for the electrodes of the catheter, wherein the given electrode is electrically coupled to both the first signal processing unit and the second signal processing unit, the first signal processing unit processing tissue proximity indicators in a different way to the second signal processing unit;

computing respective impedance values of respective ones of the second set of electrodes by the second signal processing unit;

applying the reinforcement learning agent to find respective tissue-proximity actions to be taken that maximize respective expected rewards for the respective ones of the second set of electrodes responsively to the computed respective impedance values of the respective ones of the second set of electrodes; and providing respective derived tissue-proximity indications of proximity of the respective ones of the second set of electrodes with the tissue responsively to the found respective tissue-proximity actions to be taken for the respective ones of the second set of electrodes, the processor providing the respective derived tissue-proximity indications of proximity of the respective ones of the second set of electrodes connected to the second signal processing unit, that reconcile with results provided by the first signal processing unit.

2. The method according to claim 1, wherein each of the sets of available tissue-proximity actions to be taken includes: changing a respective one of the derived tissue-proximity indications provided in a respective last one of the reinforcement learning exploitation phases; and not changing the respective one of the derived tissue-proximity indications provided in the respective last one of the reinforcement learning exploitation phases.

3. The method according to claim 2, wherein each one of the respective states includes: the respective one of the derived tissue-proximity indications provided in the respective last one of the reinforcement learning exploitation phases; and a respective impedance value of the given electrode computed for a current respective one of the reinforcement learning exploitation phases.

4. The method according to claim 3, further comprising computing the respective actual rewards responsively to the respective found ones of the tissue-proximity actions to be taken and respective reference tissue-proximity indications computed independently of applying the reinforcement learning agent.

5. The method according to claim 4, wherein computing the respective actual rewards comprises computing a sum of future discounted rewards.

6. The method according to claim 1, wherein the computing the respective reference tissue-proximity indications includes computing the respective reference tissue-proximity indications responsively to respective impedance values of the given electrode.

7. The method according to claim 1, further comprising: applying body surface electrodes to a skin surface of the living subject;
electrically coupling the body surface electrodes to the first signal processing unit; and computing respective impedance values between the given electrode and the body
surface electrodes, wherein the computing the respective reference tissue-proximity indications is performed by the first signal processing unit responsively to the computed respective impedance values.

8. The method according to claim 1, wherein the reinforcement learning agent is a deep-reinforcement learning agent.

9. The method according to claim 1, wherein the reinforcement learning agent is a Q-learning model-free reinforcement learning agent.

10. A system to find tissue proximity indications, comprising:
a catheter configured to be inserted into a body part of a living subject, and comprising
electrodes configured to contact tissue at respective locations within the body part; and
processing circuitry configured to:
receive signals detected by the electrodes;
selectively reward and penalize a reinforcement learning agent over reinforcement learning exploration phases to learn at least one tissue proximity policy responsively to at least one of the received detected signals;
apply the reinforcement learning agent in reinforcement learning exploitation phases to find respective tissue-proximity actions to be taken that maximize respective expected rewards responsively to the at least one tissue proximity policy; and
provide respective derived tissue-proximity indications of proximity of a given one of the electrodes with the tissue responsively to the found respective tissue-proximity actions,
wherein
the catheter includes a first set and a second set of electrodes, the second set of the electrodes being different from the first set of the electrodes,
the system further comprising:
a first signal processing unit configured to be electrically coupled to the first set of the electrodes, and compute the respective reference tissue-proximity indications responsively to receiving at least one signal provided by the given electrode; and
a second signal processing unit configured to be electrically coupled to the second set of the electrodes of the catheter and the given electrode, the given electrode being in the first set of the electrodes, and compute the respective impedance value of the given electrode for each one of the respective states responsively to receiving the at least one signal provided by the given electrode, the first signal processing unit and the second signal processing unit configured to provide input connections for the electrodes of the catheter, wherein the given electrode is electrically coupled to both the first signal processing unit and the second signal processing unit, the first signal processing unit processing tissue proximity indicators in a different way to the second signal processing unit, the second signal processing unit is configured to compute respective impedance values of respective ones of the second set of electrodes;

the processing circuitry is configured to apply the reinforcement learning agent to find respective tissue-proximity actions to be taken that maximize respective expected rewards for the respective ones of the second set of electrodes responsively to the computed respective impedance values of the respective ones of the second set of electrodes; and provide respective derived tissue-proximity indications of proximity of the respective ones of the second set of electrodes with the tissue responsively to the found respective tissue-proximity actions to be taken for the respective ones of the second set of electrodes, the processing circuitry configured to provide the respective derived tissue-proximity indications of proximity of the respective ones of the second set of electrodes connected to the second signal processing unit, that reconcile with results provided by the first signal processing unit.

11. The system according to claim 10, wherein the processing circuitry is configured to:

apply the reinforcement learning agent in respective ones of the reinforcement learning exploitation phases to find respective ones of the tissue-proximity actions to be taken that maximize respective expected rewards responsively to respective states of the reinforcement learning agent and respective sets of available tissue-proximity actions to be taken; and selectively reward and penalize the reinforcement learning agent over the reinforcement learning exploration phases responsively to data of respective last ones of the reinforcement learning exploitation phases, the data comprising: respective ones of the states, respective found ones of the tissue-proximity actions to be taken, and respective actual rewards.

12. The system according to claim 11, wherein each of the sets of available tissue-proximity actions to be taken includes: changing a respective one of the derived tissue-proximity indications provided in a respective last one of the reinforcement learning exploitation phases; and not changing the respective one of the derived tissue-proximity indications provided in the respective last one of the reinforcement learning exploitation phases.

13. The system according to claim 12, wherein each one of the respective states includes: the respective one of the derived tissue-proximity indications provided in the respective last one of the reinforcement learning exploitation phases; and a respective impedance value of the given electrode computed for a current respective one of the reinforcement learning exploitation phases.

14. The system according to claim 13, wherein the processing circuitry is configured to compute the respective actual rewards responsively to the respective found ones of the tissue-proximity actions to be taken and respective reference tissue-proximity indications computed independently of applying the reinforcement learning agent.

15. The system according to claim 14, wherein the processing circuitry is configured to: compute a sum of future discounted rewards; and compute the respective actual rewards responsively to the computed sum of future discounted rewards.

16. The system according to claim 14, wherein the processing circuitry is configured to:

compute the respective impedance value of the given electrode for each one of the respective states responsively to at least one of the received detected signals; and compute the respective reference tissue-proximity indications independently of applying the reinforcement learning agent responsively to at least one of the received detected signals.

17. The system according to claim 16, wherein the processing circuitry is configured to compute the respective reference tissue-proximity indications responsively to respective impedance values of the given electrode.

18. The system according to claim 10, further comprising body surface electrodes configured to be applied to a skin surface of the living subject, the first signal processing unit being configured to be electrically coupled to the body surface electrodes, wherein the first signal processing unit is configured to: compute respective impedance values between the given electrode and the body surface electrodes; and compute the respective reference tissue-proximity indications responsively to the computed respective impedance values.

19. The system according to claim 10, wherein the reinforcement learning agent is a deep-reinforcement learning agent.

20. The system according to claim 10, wherein the reinforcement learning agent is a Q-learning model-free reinforcement learning agent.

* * * * *